United States Patent [19]

Skochdopole et al.

[11] Patent Number: 5,162,461

[45] Date of Patent: * Nov. 10, 1992

[54] THERMOPLASTIC POLYBLENDS OF AROMATIC POLYCARBONATES AND THERMOPLASTIC POLYURETHANES

[75] Inventors: Richard E. Skochdopole; Dane L. Wright, both of Midland, Mich.

[73] Assignee: The Dow Chemical Company, Midland, Mich.

[*] Notice: The portion of the term of this patent subsequent to Mar. 27, 2007 has been disclaimed.

[21] Appl. No.: 644,476

[22] Filed: Jan. 18, 1991

Related U.S. Application Data

[63] Continuation of Ser. No. 346,505, May 2, 1989, abandoned.

[51] Int. Cl.$^5$ .................. C08L 69/00; C08L 75/06
[52] U.S. Cl. .................................... 525/66; 525/415; 525/439; 525/450; 525/453; 525/467
[58] Field of Search ............... 525/66, 413, 415, 439, 525/453, 467, 450

[56] References Cited

U.S. PATENT DOCUMENTS

| | | | |
|---|---|---|---|
| 3,431,224 | 3/1969 | Goldblum | 260/13 |
| 4,034,016 | 7/1977 | Baron et al. | 260/858 |
| 4,179,479 | 12/1979 | Carter, Jr. | 525/66 |
| 4,350,799 | 9/1982 | Schmelzer et al. | 525/453 |
| 4,743,650 | 5/1988 | Boutni | 525/92 |
| 4,912,177 | 3/1990 | Skochdopole | 525/66 |
| 4,929,674 | 5/1990 | Nouvertne | 525/66 |

FOREIGN PATENT DOCUMENTS

| | | | |
|---|---|---|---|
| 078992 | 5/1983 | European Pat. Off. | 525/453 |
| 104695 | 4/1984 | European Pat. Off. | 525/66 |
| 125739 | 11/1984 | European Pat. Off. | 525/66 |

*Primary Examiner*—James J. Seidleck
*Assistant Examiner*—David Buttner

[57] ABSTRACT

This invention relates to binary thermoplastic polyblend that comprises a thermoplastic aromatic polycarbonate and a polycaprolactone polyol-based thermoplastic polyurethane (TPU). The polyblends exhibit improved hydrocarbon solvent resistance and melt flow properties.

12 Claims, No Drawings

THERMOPLASTIC POLYBLENDS OF AROMATIC POLYCARBONATES AND THERMOPLASTIC POLYURETHANES

This is a continuation of application Ser. No. 346,505, filed May 2, 1989 now abandoned.

BACKGROUND OF THE INVENTION

This invention relates to a thermoplastic polymeric resin which is a polyblend of a thermoplastic aromatic polycarbonate and a thermoplastic polyurethane.

Thermoplastic polycarbonate resins are readily molded at elevated temperatures to make a wide variety of articles. Exemplary of such articles are automotive parts, tool housings, structural components and the like. The use of polycarbonate on its own for molding purposes is limited as the polycarbonate has a number of deficiencies including sensitivity of impact toughness to the ambient temperature and more particularly thickness of the molded article, and susceptibility to degradation by solvents including water and hydrocarbons.

Correction of the deficiency of polycarbonate resins is known by blending the polycarbonates with other polymeric additives, as disclosed in U.S. Pat. No. 3,431,224, and addition of other compounds and stabilizers, as disclosed in U.S. Pat. Nos. 3,498,946 and 3,742,083.

Polycarbonate resins have been modified by blending with other polymers including polyethylene, polypropylene, copolymers of ethylene and an alkyl acrylate, polyamide, polyvinyl acetate, alkyl cellulose ether and polyurethane elastomer.

In U.S. Pat. No. 4,034,016 a ternary blend consisting of a polycarbonate, a polybutylene terephthalate and a thermoplastic polyurethane (hereafter referred to as TPU) is disclosed having an improved impact strength at critical thickness. U.S. Pat. No. 4,179,479 discloses a ternary blend of a TPU, a thermoplastic polycarbonate and an acrylic polymer: the latter functioning as a processing aid to confer uniformity of melt flow properties. U.S. Pat. No. 4,350,799 discloses a ternary blend containing a TPU, a polycarbonate and a polyphosphate, the blend displays reduced flammability. Ternary blends of TPU, polycarbonate and rubbers as impact modifiers are disclosed by EP 125739 and U.S. Pat. No. 4,522,979.

The preparation of binary TPU, polycarbonate blends has been little studied due to the inherent problems of compatibility between polycarbonate and TPU including, for example, large differences in melt viscosities, processing temperatures and thermodynamic solubilities. These differences are especially prominent with polyether-based TPUs.

In a recent publication, U.S. Pat. No. 4,743,650, binary blends containing polycarbonate and from 5 to about 35 parts by weight of a polyether polyol-based TPU are claimed.

Accordingly, it would be desirable to provide a binary polycarbonate, TPU blend wherein the incompatibility difference of the two polymers has been minimized and wherein molded articles prepared therefrom show improved resistance to hydrocarbon solvents and improved impact resistance and toughness compared to polycarbonate alone.

SUMMARY OF THE INVENTION

In one aspect, this invention is a thermoplastic polyblend which comprises
 (a) from 50 to 95 percent by weight based on the combined weights of (a) and (b) of a thermoplastic aromatic polycarbonate polymer: and
 (b) from 50 to 5 percent by weight based on the combined weights of (a) and (b) of one or more thermoplastic polyurethanes having a Shore Hardness from 70A to 70D, and
characterized in that the thermoplastic polyurethane is a polycaprolactone polyol-based thermoplastic polyurethane.

In a second aspect, this invention is a process for preparing a thermoplastic polyblend which comprises melt blending:
 (a) from 50 to 95 percent by weight based on the combined weights of (a) and (b) of a thermoplastic aromatic polycarbonate polymer: and
 (b) from 50 to 5 percent by weight based on the combined weights of (a) and (b) of one or more thermoplastic polyurethanes having a Shore Hardness from 70A to 70D, and
characterized in that the thermoplastic polyurethane is a polycaprolactone polyol-based thermoplastic polyurethane.

In a third aspect, this invention is an article prepared by melt extrusion or molding of a polyblend characterized in that the polyblend comprises
 (a) from 50 to 95 percent by weight based on the combined weights of (a) and (b) of a thermoplastic aromatic polycarbonate polymer; and
 (b) from 50 to 5 percent by weight based on the combined weights of (a) and (b) of one or more thermoplastic polyurethanes having a Shore Hardness from 70A to 70D, and
characterized in that the thermoplastic polyurethane is a polycaprolactone polyol-based thermoplastic polyurethane.

Surprisingly, it has been found that by using a TPU which has a Shore Hardness of from 70A to 70D in combination with a thermoplastic aromatic polycarbonate a thermoplastic polyblend which has good processing, mechanical, and chemical properties including solvent resistance can be prepared.

DETAILED DESCRIPTION OF THE INVENTION

The polyblend consists of a thermoplastic aromatic polycarbonate polymer in from at least 50, preferably at least 55 and up to 95, preferably up to 75, and more preferably up to 70 percent by weight of the combined weights of the thermoplastic aromatic polycarbonate and the thermoplastic polyurethane (TPU) present.

The TPU is present in the polyblend in from at least 5, preferably at least 25, and more preferably at least 30, and up to 50, preferably up to 45 percent by weight of the combined weights of the thermoplastic aromatic polycarbonate and the thermoplastic polyurethane (TPU) present.

Suitable thermoplastic aromatic polycarbonate polymers that can be used in the practice of this invention are those aromatic homopolycarbonates and aromatic copolycarbonates which advantageously have a molecular weight of about 10,000 to about 200,000, preferably about 15,000 to about 100,000. In addition, the polycarbonate advantageously has a melt flow rate of at least 8 g/10 minutes, preferably at least 10 g/10 minutes, and more preferably at least 12 g/10 minutes but less than 30 g/10 minutes, preferably less than 22 g/10 minutes and more preferably less than 18 g/10 minutes at 300° C. with 1.2 kg weight as measured by the ASTM Procedure D-1238.

Polycarbonates suitable for use in this present invention are prepared from dihydroxy compounds conforming to the structure of formula I or formula II

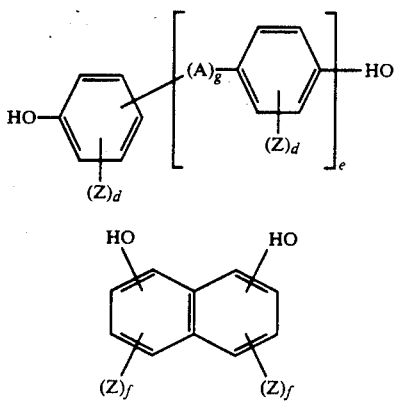

wherein A denotes an alkylene group or aryl-substituted alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 5 to 15 carbon atoms, a carbonyl group, an oxygen atom, a sulfur atom, an —SO— or —SO$_2$— radical or a radical of the general formula:

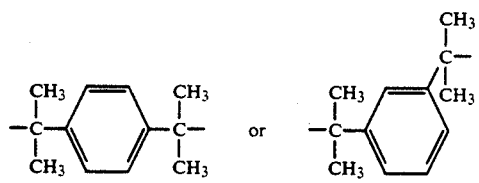

g denotes the number 0 or 1; e denotes the number 0 or 1: Z denotes F, Cl or Br atoms or a C$_{1-4}$ alkyl and if several Z radicals are substituents in one aryl radical, they may be identical or different: d denotes 0 or an integer of from 1 to 4: and f denotes 0 or an integer of from 1 to 3. Preferred are the dihydroxy compounds where g is 1 and e is 1.

Among the useful dihydroxy compounds in the practice of the invention are hydroquinone, resorcinol, bis-(hydroxyphenyl)alkanes, bis-(hydroxyphenyl)cycloalkanes, bis-(hydroxyphenyl)ethers, bis-(hydroxyphenyl)ketones, bis-(hydroxyphenyl)sulfoxides, bis-(hydroxyphenyl)sulfones and c,c-bis-(hydroxyphenyl)-diisopropylbenzenes. These and further suitable aromatic dihydroxy compounds are described in U.S. Pat. Nos. 2,991,273; 2,999,835; 2,999,846; 3,014,891; 3,028,365; 3,035,021; 3,035,036; 3,036,037; 3,036,038; 3,036,039; 3,148,172; 3,271,367; 3,271,368 and 3,280,078 (all incorporated herein by reference), in German Offenlegungsschriften (German Published Specifications) 1,570,703; 2,063,050; 2,063,052; 2,211,956 and 2,211,957, in French Patent Specification 1,561,518 and in the monograph, H. Schnell, *Chemistry and Physics of Polycarbonates*, Interscience Publishers, New York (1964). Further examples of suitable dihydroxy compounds are the bisphenols including 2,2-bis-(4-hydroxyphenyl)propane, (bisphenol A), 2,4-bis-(4-hydroxyphenyl)-2-methylbutane, 1,1-bis-(4-hydroxyphenyl)cyclohexane, α, α-bis-(4-hydroxyphenyl-p-diisopropylbenzene, 2,2-bis-(3-chloro-4-hydroxyphenyl)propane, 2,2-bis-(3,5-dichloro-4-hydroxyphenyl) propane, 2,2-bis-(3,5-dibromo-4-hydroxyphenyl) propane and 1,1-bis-(4-hydroxyphenyl)-1-phenylethane hydroxybenzophenone and 4,4-sulfonyl diphenol.

The polycarbonates of the invention may entail in their structure units derived from one or more of the suitable dihydroxy compounds.

The most preferred dihydroxy compounds when g is 1 and e is 1 are the bisphenols, especially 2,2-bis-(4-hydroxyphenyl)propane (bisphenol A).

The preparation of polycarbonate resins may be carried out in accordance with any of the processes known in the art, for example, by the interfacial polycondensation process, polycondensation in a homogeneous phase or by transesterification. The suitable processes and conditions have been disclosed in the literature and in general are described in the above-mentioned monograph by H. Schnell.

In the preparation of the polycarbonate resins of the invention, monofunctional reactants such as monophenols may be used in order to limit their respective molecular weights. Also, branching may be obtained by the incorporation, in the respective processes, of small amounts, preferably of between about 0.05 and 2.0 molecular percent (relative to the dihydroxy compound employed) of branching agents which are at least trifunctional compounds, especially, compounds having three or more phenolic hydroxyl groups.

Polycarbonates of this type are described, for example, in German Offenlegungsschriftens (German Published Specifications) 1,570,533; 1,595,762; 2,116,974 and 2,113,347, British Specification 1,079,821 and U.S. Pat. No. 3,544,514 (incorporated herein by reference).

Some examples of compounds with at least three or more phenolic hydroxyl groups which can be used are phloroglucinol, 4,6-dimethyl-2,4,6-tri-(4-hydroxyphenyl)heptane, 2,4,6-trimethyl-2,4,6-tri-(4-hydroxyphenyl)heptane, 1,4,5-tri-(4-hydroxyphenyl)benzene, 1,1,1-tri-(4-hydroxyphenyl)ethane, tri-(4-hydroxyphenyl)-phenylmethane, 2,2-bis-(4,4-bis-(4-hydroxyphenyl)cyclohexyl)propane, 2,4-bis-(4-hydroxyphenylisopropyl)-phenol, 3,6-bis-(2-hydroxy-5'-methylbenzyl)-4-methylphenol, 2-(4-hydroxyphenyl)-2-(2,4-dihydroxyphenyl)propane, hexa(4-(4-hydroxyphenyl-hexa(4-(4-hydroxyphenyl-isopropyl)phenyl)orthoterephthalic acid ester, tetra-(4-hydroxyphenyl)methane, tetra-(4-(4-hydroxyphenyl-isopropyl)phenoxy)methane and 1,4-bis-(4', 4''-dihydroxytriphenyl)methyl)benzene. Some of the other trifunctional compounds are 2,4-dihydroxybenzoic acid, trimellitic acid, trimesic acid, cyanuric chloride and 3,3-bis-(4-hydroxyphenyl)-2-oxo-2,3-dihydroindole.

Thermoplastic polyurethanes are substantially linear polymers and have thermoplastic processing characteristics. They may be prepared from the reaction of an organic polyisocyanate, preferably a diisocyanate with a polyahl composition in the presence of a chain extender. Examples of suitable polyahls include polycaprolactone polyols, polyester polyols and polyether polyols. The respective TPUs are referred to as polycaprolactone polyol-based TPUs, polyester polyol-based TPUs and polyether polyol-based TPUs, respectively.

The thermoplastic polyurethane can be prepared by methods as disclosed in U.S. Pat. Nos. 3,214,411 or 4,376,834, the teachings of which are incorporated herein by reference. In a preferred embodiment the thermoplastic polyurethanes which can be used in this present invention are the polycaprolactone polyol-based TPUs.

The Shore Hardness of the thermoplastic polyurethane is measured according to ASTM D-2240. The thermoplastic polyurethane has a Shore Hardness of from 70A on the "A" scale and up to 70D on the "D" scale. The TPU preferably has a Shore Hardness of from 70A to 100A, and more preferably from 75A to 100A. On the "D" scale, the TPU preferably has a hardness of from 40D to 70D and more preferably from 40D to 65D. A larger number indicates a harder TPU.

The TPU is further characterized in that it has a melt flow rate of from at least 6, preferably at least 8, more preferably at least 10 and up to up to 40, preferably up to 35 and more preferably up to 30 g/10 min. Melt flow rates are determined according to procedure ASTM D-1238.

Polycaprolactone polyols which can be used to prepare polycaprolactone polyol-based TPUs useful in the present invention are those manufactured from a lactone or preferably a caprolactone. Processes for the manufacture of polycaprolactone polyols are disclosed by U.S. Pat. Nos. 2,933,477 or 2,933,478, the relevant parts of which are incorporated herein by reference.

The polycaprolactone polyol used to prepare the TPUs employed in the present invention advantageously has a molecular weight of at least 500, preferably at least 1250, and more preferably at least 2000, but less than 20,000, preferably less than 10,000 and more preferably less than 8000. The functionality of the polyol, number of isocyanate-reactive hydrogens per molecule, is advantageously not greater than 6, and preferably, the functionality is in the range of 2 to 4.

Any of the organic polyisocyanates and diisocyanates employed in the preparation of polyurethanes can be employed in preparing the TPUs required for the present invention. Illustrative of such isocyanates are: methylene bis(phenylisocyanates) including the 4,4'-isomer, the 2,4'-isomer and mixtures thereof, meta- and para-phenylene diisocyanates, chlorophenylene diisocyanates, α, α'-xylylene diisocyanate, 2,4- and 2,6-toluene diisocyanate and mixtures of these latter two isomers which are available commercially, toluidine diisocyanate, hexamethylene diisocyanate, 1,5-naphthalene diisocyanate, isophorone diisocyanate and methylene bis(cyclohexylisocyanate) including the 4,4'-isomer and 2,4'-isomer, and mixtures thereof.

Preferably, the organic polyisocyanate employed to prepare the TPUs useful in this invention is methylene bis(phenylisocyanate) in the form of the 4,4'-isomer as well as mixtures of the 4,4'-isomer with amounts (up to about 70 percent by weight) of the 2,4'-isomer and modified forms of these diisocyanates. By the latter are meant those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols: such modified methylene bis(phenylisocyanates) are described in U.S. Pat. Nos. 3,394,164; 3,883,571; 4,115,429; 4,118,411 and 4,299,347; and those wherein a minor amount of the diisocyanate has been converted to the corresponding carbodiimide as described in, for example, U.S. Pat. No.. 3,384,653. Mixtures of the above-described polyisocyanates can be employed if desired.

The chain extenders which are used in making the TPUs required by the present invention are aliphatic straight- and branched chain diols including cycloaliphatic diols, preferably having from 2 to 8 carbon atoms, inclusive, in the chain. Illustrative of such diols are ethylene glycol, 1,3-propanediol, 1,5-pentanediol, 1,6-hexanediol, 1,2-propanediol, 1,3-butanediol, 1,4-butanediol, 2,3-butanediol, 1,3-pentanediol, 1,2-hexanediol, 3-methylpentane-1,5-diol, 1,4-cyclohexane dimethanol, and the like including mixtures of two or more such diols. The chain extenders which can be used alone or in admixture with each other or any one of the above diols also include diethylene glycol, dipropylene glycol, tripropylene glycol, ethanolamine, n-methyl diethanolamine, n-ethyl diethanolamine and the like, as well as ester diols obtained by esterifying adipic, azelaic, glutaric and the aliphatic dicarboxylic acids with aliphatic diols such as those exemplified above utilizing from about 0.01 to about 0.8 mole of acid per mole of diol. Also included in the chain extenders which can be used in preparing the TPUs are adducts obtained by an aliphatic diol or triol such as 1,4-cyclohexane dimethanol, neopentyl glycol, hexane-1,2-diol, ethylene glycol, butane-1,4-diol, trimethylolpropane, and the like, with caprolactone in a mole ratio of from about 0.01 to about 2 moles of caprolactone per mole of diol or triol.

While any of the diol extenders described and exemplified above can be employed in preparing the thermoplastic polyurethane, alone, or in admixture, it is preferred to use 1,4-butanediol, neopentyl glycol, 1,4-cyclohexane dimethanol, ethylene glycol and diethylene glycol either alone or in admixture with each other.

The hardness of the TPU is controlled in part by the quantity and type of chain extender employed in its preparation. Larger amounts of chain extender generally give harder TPUs.

The polyol, the organic polyisocyanate and the chain extender may be individually heated preferably to a temperature of from about 60° C. to about 135° C. and then the polyol and chain extender may be substantially simultaneously mixed with the polyisocyanate. Preferably, the chain extender and the polyol, each of which has been previously heated, are first mixed and the resulting mixture is mixed with the heated polyisocyanate. This method is preferred for the reason that the extender and the polycaprolactone polyol will not react prior to the introduction of polyisocyanate and rapid mixing with the polyisocyanate is thus facilitated.

Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference.

Other techniques for the production of thermoplastic polyurethanes useful in the context of the present invention are disclosed in the text "Polyurethanes: Chemistry and Technology", Vol. 2, pp. 299–452 by J. H. Saunders and K. C. Frisch, Interscience Publishers, New York (1964) incorporated herein by reference.

The above and other thermoplastic polyurethanes such as disclosed in U.S. Pat. Nos. 2,621,166; 2,729,618; 3,214,411; 2,778,810 and 4,376,834, Canadian Patents 754233; 733577 and 842325 all incorporated herein by reference, which are suitable in the context of the presently described invention, may be used to prepare the thermoplastic polyblends.

The polyblends of this invention can be prepared by mixing the thermoplastic aromatic polycarbonate with the thermoplastic polyurethane. The blending may be carried out by adding the polycarbonate and polyurethane together and mixing the components with conventional technique and apparatus. In general, the mixtures may be blended by optionally premixing in conventional mixing rolls, dough mixers, Banbury mixers and the like and blending the premix in an extruder or fluxing it on a mill at an elevated temperature sufficient to achieve a melt blending. Prior to melt-blending it is important that all ingredients are dried thoroughly, in for example, a dehumidifying dryer operating at a temperature of greater than 95° C., and are essentially water-free.

The temperature employed in the melt-blending process is sufficient to allow the preparation of the polyblend described in the present invention. Advantageously, the temperature does not exceed the decomposition temperature of the TPU that is to be blended with the polycarbonate. Typically, initial temperatures employed in a melt-blending process will be less than about 260° C., preferably less than about 250° C. and more preferably less than about 240° C. These temperatures can be maintained or reduced as appropriate so as to maintain an efficient melt-blending process whilst minimizing any possibility of decomposing the TPU.

Advantageously, the melt-blending process is conducted substantially free of a processing aid such as described by U.S. Pat. No. 4,179,479 and incorporated herein by reference. Such processing aids consist of an acrylic polymer having a number average molecular weight of from about 500,000 to about 1,500,000. The acrylic polymer is selected from the group consisting of homopolymers of methyl methacrylate; copolymers of methyl methacrylate with n-butyl methacrylate or ethyl acrylate: or terpolymers of methyl methacrylate, n-butyl acrylate and styrene.

By "substantially free" it is meant that the processing aid is present in less than 5.0, preferably less than 3.0 and more preferably less than 1.0 percent by weight based on the combined weight of (a) and (b), and most preferably it is absent.

The thermoplastic polyblend in its melt-blended state can be used to prepare articles through extrusion techniques with or without subsequent forming or injection molding. Alternatively, the polyblend may be transformed into pellets by suitable techniques, such as, for example, disclosed by U.S. Pat. Nos. 3,642,964 and 3,963,679, and stored for future use.

The thermoplastic polyblends of the present invention may also optionally contain various commonly known and used additives such as, for example, impact modifying agents: antioxidants: antistatic agents; inert fillers such as glass, talc, mica and clay; ultraviolet radiation absorbers such as benzophenones, benzotriazoles and the like; hydrolytic stabilizers such as the epoxides disclosed in U.S. Pat. Nos. 3,489,716; 4,138,379 and 3,839,247 all of which are incorporated herein by reference: color stabilizers such as organophosphites: thermostabilizers such as phosphites; flame retardants and mold release agents.

Representative of suitable impact modifying agents are selectively hydrogenated linear, sequential or radial teleblock copolymers of a vinyl aromatic compound and an olefinic elastomer such as described in U.S. Pat. Nos. 3,281,383; 3,753,936 and 4,481,331 which are incorporated herein by reference.

The impact modifying agents, optionally, employed in preparing the polyblends of the present invention may also include rubbers or rubber-modified polystyrene such as described in European Patent 125,739 and U.S. Pat. No. 4,101,504, and acrylate copolymers and core shell polymers as described in U.S. Pat. No. 4,092,202.

Sufficient quantities of the impact modifying agent are employed to give the desired increase in impact performance of the polyblend. Advantageously, the quantity of impact modifying agent employed is from 0.1 to 10, preferably from 2.0 to 10.0, and more preferably from 3.0 to 8.0 weight percent of the combined weight of the thermoplastic aromatic polycarbonate (a) and thermoplastic polyurethane (b) in the polyblend.

Sufficient quantities of the filler are employed to give a desired increase in modulus and/or a decrease in the coefficient of linear thermal expansion of the polyblend. Advantageously, the quantity of filler employed is from 2.0 to 25.0 and is preferably from 5 to 15 weight percent of the combined weight of the thermoplastic aromatic polycarbonate (a) and thermoplastic polyurethane (b) in the polyblend.

Impact modifying agents and fillers can be, and advantageously are, used in combination to enhance the physical properties of the polyblend.

In addition to the thermoplastic aromatic polycarbonate and thermoplastic polyurethane, the polyblend of the present invention may also comprise certain proportions of at least one member of the class consisting of polypropylene, polyethylene polyisobutylene, a copolymer of ethylene and an alkyl acrylate, a copolymer of ethylene and propylene, a cellulose ester, a polyamide, a polyvinyl acetal and an alkyl cellulose ether.

The polyblends of the present invention can be melt extruded or molded to form articles such as automotive parts, tool housings, structural components, recreational objects, household appliances and enclosures for transportation or communication and the like. The use of the polyblends of the invention in place of thermoplastic polycarbonate in such applications is particularly advantageous where in the application there is a risk of the article coming into contact with organic solvents, especially hydrocarbon solvents.

ILLUSTRATIVE EMBODIMENTS

The following examples are given to illustrate the invention and should not be interpreted as limiting it in any way. Unless stated otherwise, all parts and percentages are given by weight.

The following materials are used in the examples. All thermoplastic polyurethanes described herein below are adducts of methane diphenylisocyanate.

| | Thermoplastic Polyurethanes (TPU) |
|---|---|
| TPU-A | a thermoplastic polyurethane prepared fom a polycaprolactone polyol having a Shore Hardness of 80 A (ASTM D-2240) and an estimated tensile strength of 5500 psi (ASTM D-412) and a melt flow rate (MFR) (ASTM D-1238-85) of 8 g/10 minutes at 190° C./8.7 kg. |
| TPU-B | a thermoplastic polyurethane prepared from a polycaprolactone polyol having a Shore Hardness of 90 A and an estimated tensile strength of 6000 psi and a MFR of 10 g/10 minutes at 224° C./1.2 kg. |
| TPU-C | a thermoplastic polyurethane prepared from a |

| | -continued |
|---|---|
| | polycaprolactone polyol having a Shore Hardness of 55 D and an estimated tensile strength of 6600 psi and a MFR of 15 g/10 minutes at 224° C./2.16 kg. |
| TPU-D | a thermoplastic polyurethane prepared from a polycaprolactone polyol having a Shore Hardness of 65 D and a tensile strength of 6000 psi and a MFR of 35 g/10 minutes at 224° C./5.0 kg. |
| TPU-E | thermoplastic polyurethane prepared from a polybutylene adipate ester polyol having Shore Hardness of 90 A and an estimated tensile strength of 6000 psi and a MFR 15 g/10 minutes at 224° C./2.16 kg. |
| TPU-F | a thermoplastic polyurethane prepared from a polytetramethylene glycol, polyether polyol, having a Shore Hardness of 90 A and an estimated tensile strength of 6200 psi and a MFR 17 g/10 minutes at 224° C./2.16 kg. |
| | Thermoplastic Polycarbonate |
| PC-1 | a commercially available thermoplastic polycarbonate Calibre ® 300-15, sold by The Dow Chemical Company, derived from bisphenol A having a melt flow rate of 15 g/10 minutes at 300° C./2.8 kg weight (ASTM D-1238). |

The polyblends of the following examples are prepared in a Werner-Pfleider Twin-Screw extruder ZSK-30 operating at 400 rpm, torque 60–70 percent, die pressure 100 psi, front zone temperature 240° C., rear zone temperature 230° C. Polycarbonate polymer was dried prior to blending for at least 4 hours in a circulating air oven at about 120° C. Similarly, TPU polymer was dried in a dehumidifying dryer at about 99° C. for at least 4 hours.

Molded articles from the polyblends are prepared by injection molding using an Arbury 28 ton injection molder operating at injection pressure 600–800 psi, holding pressure 300–450 psi, nozzle temperature 227° C.–215° C., all barrel temperature 232° C.–220° C., mold temperature 49° C.–38° C. Prior to molding, the granular polyblend is dried at 100° C. for 4 hours in a dehumidifying dryer.

The compositions of the polyblends prepared and the properties of the molded articles obtained from the polyblends are as indicated in Table I.

Test results are in accordance with the following test methods. Melt flow rates, ASTM D-1238-85; flexural modulus, ASTM D-790-84; distortion temperature under load (DTUL), ASTM D-648-82; heat sag, ASTM D-3769; notched izod, ASTM D-256-84; and environmental stress crack resistance (ESCR), GMR-3779.

TABLE I

| Example | TPU (parts by wt) | PC-1 (parts by wt) | MFR[1] | Flexural Modulus (psi × $10^5$) | DTUL[2] (°F.) | 10 mm Notched Izod (−20° F.) ft-lb/in | ESCR[3] Stress** (psi) | ESCR[3] Strain[4] (%) |
|---|---|---|---|---|---|---|---|---|
| A* | — | 100 | 15.0[6] | 3.28 | — | 15.5 | >500 | >0.1 |
| 1 | A-5 | 95 | — | 3.39 | — | 2.5 | — | — |
| 2 | A-10 | 90 | — | 3.03 | — | 14.3 | — | — |
| 3 | A-25 | 75 | 11.8 | 2.20 | 246 | 3.2 | 2210 | 1.0 |
| 4 | A-30 | 70 | 19.0 | 1.70 | 246 | 4.9 | 2400 | — |
| 5 | A-35 | 65 | 30.6 | 1.50 | 239 | 18.5 | 3000 | — |
| 6 | A-40 | 60 | 63.7 | 1.10 | 223 | 19.6 | 2200 | — |
| 7 | A-50 | 50 | — | 0.31 | — | 10.7 | — | — |
| 8 | B-25 | 75 | 6.9 | 2.30 | 263 | 2.1 | 2320 | 1.0 |
| 9 | B-30 | 70 | 10.7 | 2.10 | 260 | 1.9 | 4200 | 2.0 |
| 10 | B-35 | 65 | 14.5 | 1.80 | 253 | 1.7 | 3260 | 2.0 |
| 11 | B-40 | 60 | 22.7 | 1.60 | 250 | 2.0 | 3140 | [5] |
| 12 | B-45 | 55 | 34.8 | 1.30 | 241 | 2.1 | 2680 | [5] |
| 13 | C-25 | 75 | 6.8 | 2.50 | 259 | 1.3 | 2520 | 1.0 |
| 14 | C-30 | 70 | 8.4 | 2.30 | 257 | 1.7 | 1160 | <0.5 |
| 15 | C-35 | 65 | 9.8 | 2.00 | 253 | 1.6 | 2030 | 1.0 |
| 16 | C-40 | 60 | 19.3 | 1.80 | 249 | 1.5 | 1770 | 1.0 |
| 17 | C-45 | 55 | 22.6 | 1.70 | 241 | 1.5 | 3420 | 2.0 |
| 18 | D-25 | 75 | 7.1 | 2.80 | 264 | 1.7 | 2760 | 1.0 |
| 19 | D-30 | 70 | 8.8 | 2.70 | 263 | 1.5 | 2690 | 1.0 |
| 20 | D-35 | 65 | 16.9 | 2.40 | 257 | 1.8 | 1190 | <0.5 |
| 21 | D-40 | 60 | 22.9 | 1.90 | 254 | 1.8 | 1890 | 1.0 |
| 22 | D-45 | 55 | 27.0 | 1.80 | 249 | 1.5 | 1760 | 1.0 |
| B* | E-35 | 65 | 11.9 | 1.80 | 253 | 1.6 | 3260 | 2.0 |
| C* | F-35 | 65 | 18.6 | 1.90 | 255 | 3.4 | 3720 | 2.0 |

*not an example of this invention
**calculated from failure strain and modulus
[1] Melt flow rate ASTM D-1238-85, 230° C./3.8 kg
[2] Distortion temperature under load (66 psi) ASTM D-648
[3] Environmental stress crack resistance GMR-3779, 75% isooctane/25% toluene
[4] Minimum at failure
[5] No failure at 2% strain
[6] Melt flow rate ASTM D-1238-85, 300° C./1.2 kg As can be seen from the data presented in Table I, the melt flow rate properties of the polyblends improve with the increasing quantity of thermoplastic polyurethane incorporated therein.

With respect to flexural modulus it is to be observed that as more TPU is incorporated into the blend the resulting blend exhibits more flexibility as seen by a lower flexural modulus. When the blended thermoplastic polyurethane is a hard polyurethane, then the increase in flexibility of the resulting blend is somewhat lower than when a similar percentage of a soft thermoplastic polyurethane is present in the polyblend.

The flexural modulus of the resulting polyblend will also be dependent on the post-injection, extruding, and mold thermal history to which the polyblend has been subjected. If the polyblend is allowed to cool slowly, hard segments contained within the thermoplastic polyurethane can more easily align into crystalline formations influencing the flexural modulus of the final product. If the polyblend is cooled quickly, there is insufficient time to obtain crystalline formations. The presence of crystalline formation can enhance the flexural modulus.

Distortion temperatures under load become relatively lower as the quantity of TPU in the polyblend increases. The polyblends prepared with harder thermoplastic polyurethanes, show superior DTUL performance in relation to polyblends prepared with softer thermoplastic polyurethanes.

In the notched izod impact test, a surprising and unexpected result is the superior performance of polyblends made with the polycaprolactone polyol-based thermoplastic polyurethane having a Shore Hardness of 80A, especially when such TPU is present at 35, 45 and 50 percent by weight of the polyblend as for Examples 5–7.

The environmental stress crack resistance (ESCR) observations indicate that as the quantity of thermoplastic polyurethane present in the polyblend increases, the better the resistance. Again, as with the impact strength properties, optimum ESCR performance is observed when using thermoplastic polyurethanes having a Shore Hardness from about 80A to about 90A. The data also suggests that optimum solvent resistance is obtained when the thermoplastic polyurethane is present in from about 30 to about 40 percent by weight of the polyblend.

Comparative examples B and C relate to a polyblend containing respectively, a polyester polyol-based TPU and a polyether polyol-based TPU, each having a Shore Hardness of 90A.

Comparison of Example 10 with B and C indicates approximately the same performance levels with respect to melt-flow rates, flexural modulus, impact properties and ESCR of the polyblends. However, comparing Example 5 with Example 10 illustrates the significantly large and unexpected improvements in melt-flow rates and impact properties whilst maintaining good ESCR performance, that can be obtained when the polyblend contains a polycaprolactone polyol-based TPU having a Shore Hardness of 80A.

What is claimed is:

1. A thermoplastic polyblend characterized in that it consists essentially of
   (a) from 50 to 75 percent by weight based on the combined weights of (a) and (b) of a thermoplastic aromatic polycarbonate polymer wherein the polycarbonate polymer backbone consists of carbonate linking groups and remnants of dihydroxy compounds; and
   (b) from 50 to 25 percent by weight based on the combined weighs of (a) and (b) of one or more polycaprolactone polyol-based thermoplastic polyurethanes having a Shore Hardness form 70A to 70D, and optionally from 0.1 to 10.0 percent by weigh of an impact modifying agent based on the combined weights of (a) and (b), and in that the resulting thermoplastic polyblend exhibits an environmental stress crack resistance of at least 1160 psi and a flexure modulus of at least $1.10 \times 10^5$ psi.

2. The polyblend of claim 1 wherein the polycarbonate has a melt-flow rate of at least 8 g/10 minutes at 300° C./1.2 kg.

3. The polyblend of claim 2 which consists essentially of
   (a) from 50 to 75 percent by weight based on the combined weights of (a) and (b) of a thermoplastic aromatic polycarbonate polymer which has a melt-flow rate of at least 10 g/10 minutes at 300° C./1.2 kg; and
   (b) from 50 to 25 percent by weight based on the combined weight of (a) and (b) of a polycaprolactone polyol-based thermoplastic polyurethane having a Shore Hardness of from 75A and 100A and optionally from 0.1 to 10.0 percent by weight of an impact modifying agent based on the combined weights of (a) and (b).

4. The polyblend of claim 2 wherein the thermoplastic polyurethane has a Shore Hardness of from 70A to 100A.

5. The polyblend of claim 4 wherein the thermoplastic polyurethane has a Shore Hardness of from about 75A to about 100A.

6. The polyblend of claim 2 wherein the thermoplastic polyurethane has a Shore Hardness of from 40D to 70D.

7. The polyblend of claim 2 additionally consisting essentially of a filler.

8. The polyblend of claim 7 wherein the filler is present in from 2.0 to 25.0 percent by weight of the combined weights of (a) and (b).

9. The polyblend of claim 1 wherein the polycarbonate is prepared from dihydroxy compounds conforming to the structure of Formula I or II

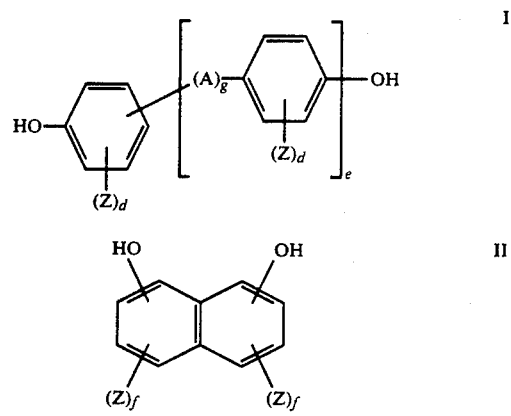

wherein A denotes an alkylene group or aryl-substituted alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 5 to 15 carbon atoms, a carbonyl group, an oxygen atom, a sulfur atoms, a —SO— or —SO$_2$— radical or a radical of the general formula:

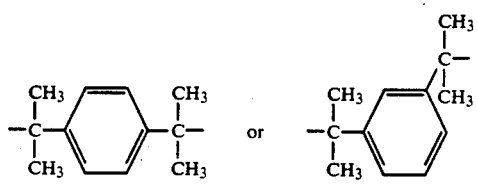

g denotes the number 0 to 1; e denotes the number 0 or 1; Z denotes F, Cl or Br atoms or a C$_{1-4}$ alkyl and if several Z radicals are substituents in one aryl radical, they may be identical or different; d denotes 0 or an integer of from 1 to 4; and f denotes 0 or an integer of from 1 to 3.

10. The polyblend of claim 9 wherein the polycarbonate is prepared from dihydroxy compounds conforming to the structure of Formula I, wherein A denotes an alkylene group or aryl-substituted alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 5 to 15 carbon atoms or a carbonyl group, d is 0, e is 1 and g is 1.

11. A process for preparing a thermoplastic polyblend which consists essentially of melt blending:
(a) from 75 to 95 percent by weight based on the combined weights of (a) and (b) of a thermoplastic aromatic polycarbonate polymer wherein the polycarbonate polymer backbone consists of carbonate linking groups and remnants of dihydroxy compounds; and
(b) from 50 to 25 percent by weight based on the combined weight of (a) and (b) of one or more thermoplastic polyurethanes having a Shore Hardness from 70A and 70D, and optionally from 0.1 to 10.0 percent by weight of an impact modifying agent based on the combined weights of (a) and (b), and characterized in that the thermoplastic polyurethane is a polycaprolactone polyol-based thermoplastic polyurethane.

12. An article prepared by melt extrusion or molding of a polyblend characterized in that the polyblend consists essentially of
(a) from 50 to 75 percent by weight based on the combined weights of (a) and (b) of a thermoplastic aromatic polycarbonate polymer wherein the polycarbonate polymer backbone consists of carbonate linking groups and remnants of dihydroxy compounds; and
(b) from 50 to 25 percent by weight based on the combined weights of (a) and (b) of one or more thermoplastic polyurethanes having a Shore Hardness of from 70A and 70D, and optionally from 0.1 to 10.0 percent by weight of an impact modifying agent based on the combined weights of (a) and (b), and in that the thermoplastic polyurethane is a polycaprolactone polyol-based thermoplastic polyurethane.

* * * * *